C. HART.
Car Wheel.
No. 6,971
Patented Dec. 25, 1849.
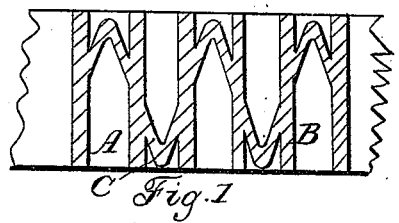
Fig. 1
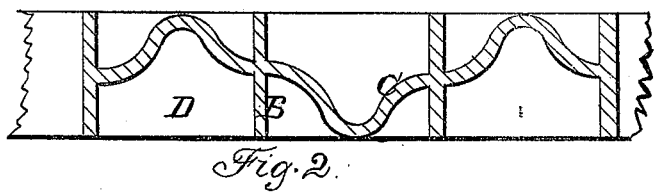
Fig. 2
Fig. 3
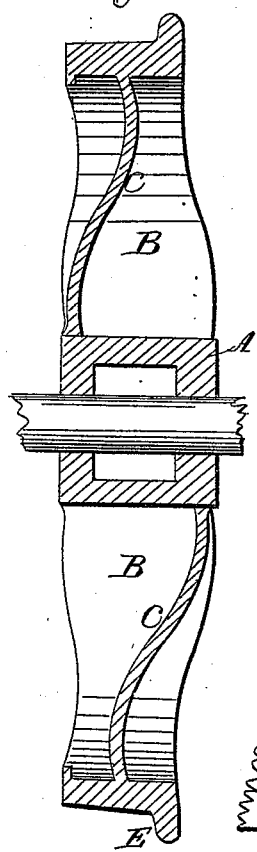
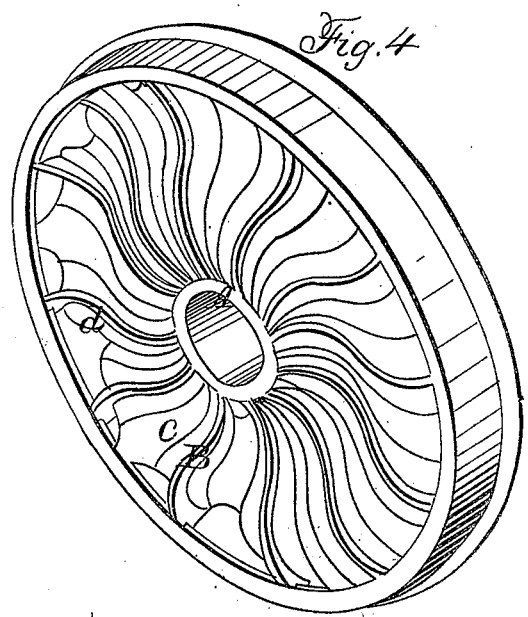
Fig. 4
Fig. 5
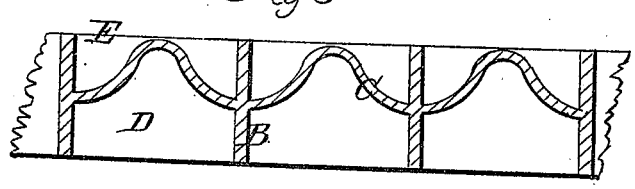
Fig. 6
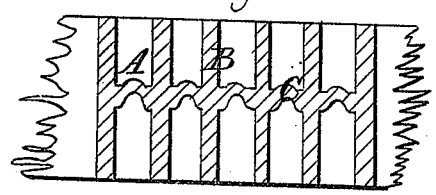

UNITED STATES PATENT OFFICE.

CARMI HART, OF NEW YORK, N. Y.

RAILROAD-CAR WHEEL.

Specification of Letters Patent No. 6,971, dated December 25, 1849.

*To all whom it may concern:*

Be it known that I, CARMI HART, of the city, county, and State of New York, have invented a new and Improved Form of Railroad-Car Wheels; and I do hereby declare that the following is a full and exact description, reference being had to the accompanying drawings.

Plate one Figure 1 represents the surface of the hub and its connection with the spokes and flanges web on plate that part marked B represents the spokes A, the hub and *c* the plate or flanges. Fig. 2 represents the inner surface of the rim and the connection of the spokes and flanges thereto. That part marked D represents the rim; B, the spokes; *c*, the plate or flanges. Fig. 3 shows a view of the wheel as divided at the eye or center through the orifice for the axle; B, shows the spokes or arms; A, the hub, *c* in Fig. 3 represents the connection of the plate or flanges with the spokes, as they pass or extend from the hub to the rim of the wheel. Fig. 4 represents a perspective view of the entire wheel, A showing the hub, B the spokes or arms, *c* the flange or plate, *d* the connection of the plate or flange to the rim of the wheel.

My wheel consists of a solid hub and a rim of the usual form the disk or that part contained betwixt the hub and rim consists of a series of curved or ogee spokes connected to each other by a series of plates or flanges of an ogee or a crooked surface or form as they extend from the hub to the rim of the wheel, and also of an ogee or crooked surface as they extend or spread from one spoke to the other around the entire wheel, and running obliquely from one side of the wheel to the other upon the outer surface of the hub and upon the inner surface of the rim as they extend around the entire wheel, the plate or flanges at the edges are connected to the spokes in such a manner as to give corrugated or curved lines along the sides of the spokes from the outer edge of the hub to the center of the spokes at the rim of the wheel betwixt two of the spokes and reversed in the opposite side in like manner in the next opening and thus forming a waving line in and out at each alternate section between the spokes through the entire wheel it will be seen that by the above arrangements the flange or plate does not form a line opposite to each other upon the spokes but leaves each section of the wheel formed of two spokes and one plate or flange free and capable of expansion and contraction independent to a great extent of the other parts of the wheel, whereby each section of the wheel will yield to any unequal cooling without effecting the other parts and at the same time form a perfect brace to the wheel in every possible direction.

My wheels are cast of one entire and solid piece of metal it will be seen by the above described curved spokes and crooked flanges or plates a wheel can be formed so as to give no straight line of metal betwixt the hub and rim nor in any given circle of the wheel except in the hub and rim whereby wheels can be cast without causing any uneven strain upon the wheel leaving them entirely free from strain or cracking which, has been found to be so difficult in all other wheels, and at the same time its construction being such as to give great strength to the wheel and admit of any required chill upon the tread without straining the wheel or causing it to crack or break.

I contemplate some times in forming my wheels as herein after described and represented by Figs. 5 and 6, which I deem a modification of my plan as above set forth, Fig. 5 displaying the inner surface of the rim and the connection of the plate and flanges and arms thereto, that part marked D showing the rim B the spokes or arms C the plate or flange, by forming a wheel of this last mode I place the projecting portion of the flange directly under the flange upon the tread of the wheel marked E in Figs. 3 and 5, or I can form a wheel by inserting in each opening betwixt the spokes two of the above described plates with their surfaces nearer the outer and inner edge of the rim of the wheel, if constructed by the last named arrangement I would leave openings through each plate or flange betwixt the spokes, or I might leave openings through the plates where there were but one plate inserted betwixt the spokes.

Having thus fully described my improvement in forming and constructing a solid cast iron wheel, I do not claim as new or as my invention corrugated plates or flanges or corrugated spokes. But

What I do claim as my invention and discovery is—

The form of the car wheel made with the multiplied and reversed or alternate corrugations of the plate or flanges as above specified and described, and also the combination of the said plates or flanges with the said spokes so corrugated or bent as above set forth and described so as all together to prevent straining or cracking of the metal by contraction in cooling and giving thereby and by the said combination greater strength and durability to the cast iron car wheel than has before been attained.

CARMI HART.

Witnesses:
CHARLES A. GRIFFIN,
JNO. C. T. SMIDT.